May 8, 1934.  K. R. HERMAN  1,957,645
DELIVERY VEHICLE
Original Filed May 30, 1930   3 Sheets-Sheet 1

INVENTOR
Kenneth R. Herman

May 8, 1934. K. R. HERMAN 1,957,645
DELIVERY VEHICLE
Original Filed May 30, 1930 3 Sheets-Sheet 2

INVENTOR
Kenneth R. Herman

BY
Whittemore Hulbert Whittemore
+ Belknap ATTORNEYS

May 8, 1934.　　　　K. R. HERMAN　　　　1,957,645
DELIVERY VEHICLE
Original Filed May 30, 1930　　3 Sheets-Sheet 3

INVENTOR
Kenneth R. Herman
BY Whittemore Hulbert Whittemore
& Belknap　　ATTORNEYS Patented May 8, 1934

1,957,645

UNITED STATES PATENT OFFICE 1,957,645

DELIVERY VEHICLE

Kenneth R. Herman, Pleasant Ridge, Mich., assignor, by mesne assignments, to Continental-Divco Company, Detroit, Mich., a corporation of Michigan Application May 30, 1930, Serial No. 457,660
Renewed July 27, 1932

7 Claims. (Cl. 296—47)

This invention relates generally to motor vehicles and has particular reference to delivery cars designed for use upon routes where frequent stops are necessary.

The invention concerns itself still more particularly with that type of delivery vehicle having platforms depending from opposite sides of the frame and disposed at a level to afford full standing height clearance within a vehicle having a top of ordinary height. To this end the invention consists in a provision of a body for the vehicle overhanging the platforms and having door openings above the platforms provided with doors operable when closed to completely enclose the operator while manipulating the vehicle in a standing position upon the platform.

With the foregoing as well as other objects in view, the invention resides in the arrangement of the doors upon the body and the manner in which they cooperate with the body to completely close the door openings.

Figure 1:
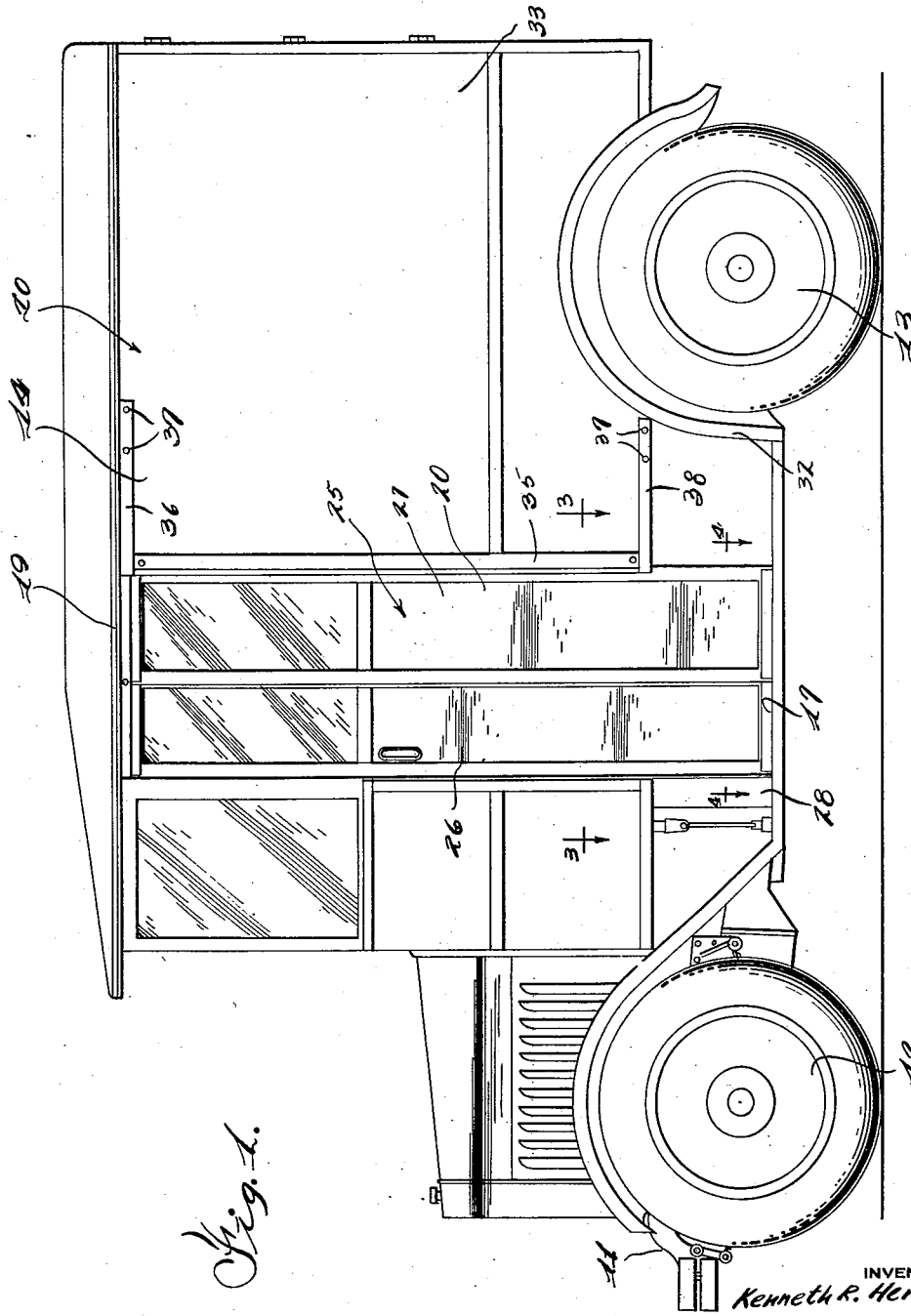
Figure 1 is a side elevational view of a delivery vehicle constructed in accordance with this invention showing one of the side doors in closed position.
Figure 2:
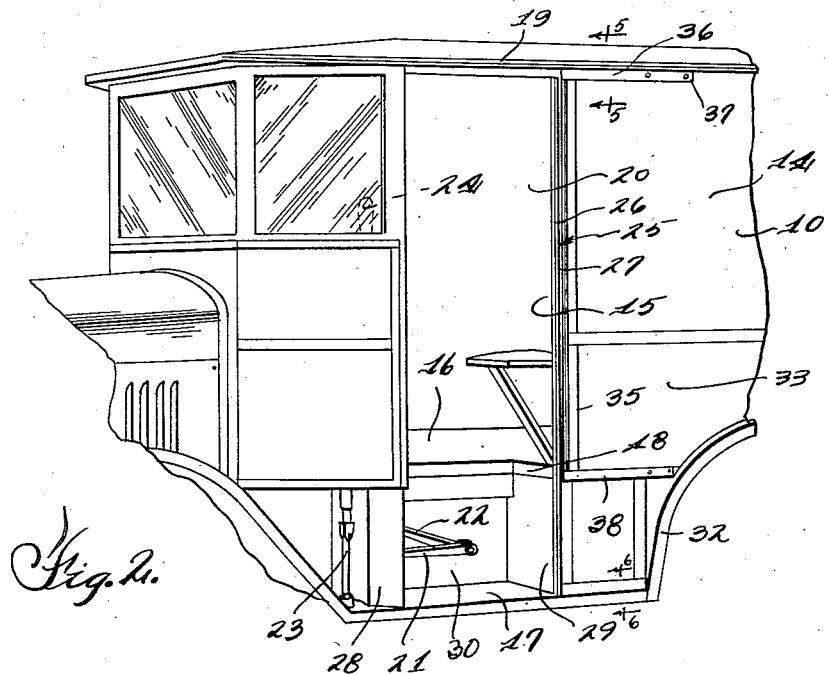
Figure 2 is a fragmentary perspective view of the construction illustrated in Figure 1 showing the door in open position.

Referring now to the drawings, it will be noted that there is illustrated in Figures 1 and 2 a delivery vehicle 10 having a chassis 11 supported adjacent the front and rear ends by the conventional steering wheels 12 and driving wheels 13, respectively. Mounted upon the chassis is a delivery body 14 provided with a storage compartment 15 having a width substantially equal to the tread of the vehicle so as to provide maximum storage space for the load. The body is provided with flooring 16 supported upon the sill members of the chassis and cut away at diametrically opposite points above the platforms 17 as illustrated at 18. The platforms 17 are supported upon opposite sides of the chassis by the sill members of the frame and are preferably disposed at a level substantially below the flooring 16 of the vehicle so as to provide standing height clearance within the vehicle body beneath the top 19 thereof which is of ordinary height. As shown particularly in Figure 2 the vehicle body 14 is provided with door openings 20 above the platforms 17 permitting the operator to expediently enter and leave the vehicle.

Figure 3:
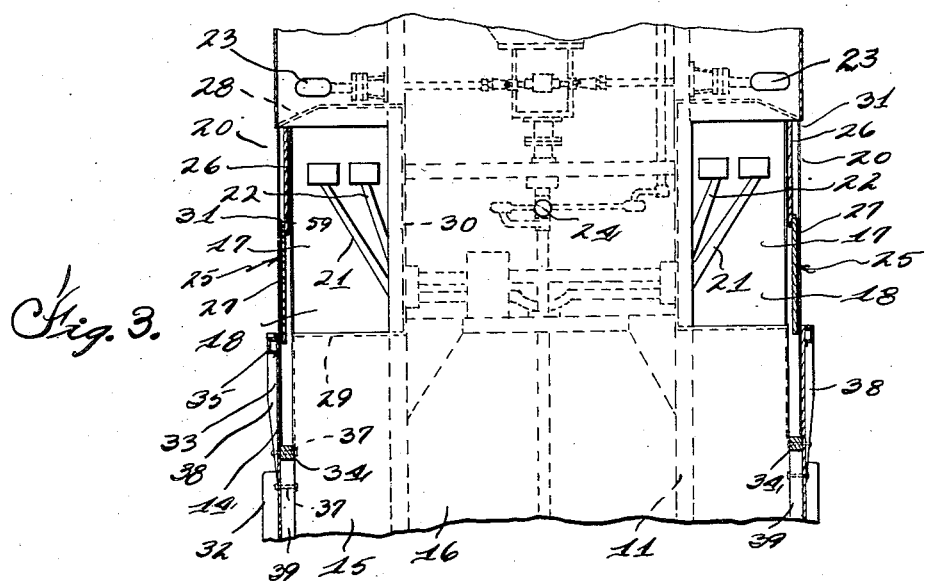
Figure 3 is a sectional view taken on the plane indicated by the line 3—3 of Figure 1.

In order to permit the operator to control the vehicle from a standing position upon either of the platforms 17 suitable control mechanism is provided above the platforms at a convenient point to be actuated from a position on either of the platforms. The control means comprises, briefly, a pair of clutch and brake pedals 21 and 22 and gear shift lever 23. The above control means is duplicated on both sides of the vehicle as shown in Figure 3 and steering of the vehicle is effected by a control mast 24 arranged centrally within the vehicle between the side door openings 20 so as to be conveniently actuated by the operator while standing on either of the platforms.

In order to enhance the general appearance of the vehicle and at the same time protect the operator from the weather while he is controlling the vehicle from a standing position on either of the platforms, I provide suitable doors 25 for the openings 20. The doors 25 are formed of two sections 26 and 27 slidable from the position illustrated in Figure 1 to the position illustrated in Figure 2 where the major portions of the doors are concealed from view and out of the way so as not to obstruct the platform and interfere with the operator while he is either making deliveries or driving the vehicle. Owing to the fact that both side door assemblies 25 are substantially the same in principle, only one door will be described herein in detail. As illustrated in both Figure 1 and 2 the door 25 extends from the top of the vehicle to the platform 17 so that when both sections of the door are moved to their closed positions as shown in Figure 1, the operator will be completely enclosed. In this connection it is to be noted that the front and rear ends of the platform are closed by brackets 28 and 29, respectively, extending laterally outwardly from the sill members of the frame while the inner side of the platform is closed by a suitable metal shroud 30 extending downwardly from the chassis frame and secured to the inner edge of platform. Thus it will be observed that when the doors are in their closed position the platforms 17 are arranged entirely within the body and full weather protection is afforded the operator.

The two sections 26 and 27 of the door 25 are adapted to overlap each other when moved to open position and are slidably mounted at the upper ends upon the top 19 of the vehicle, and are guided at the lower ends by means of a channel-shaped guide 31 embedded within the platform 17 adjacent the outer edge thereof. The channel-shaped guide 31 extends from a position adjacent the front of the platform to a position adjacent the rear fender 32 of the vehicle and is of sufficient width to receive both sections of the door. The length of the track is such as to permit the sections 26 and 27 of the doors to assume a position in rear of the bracket 29 when they are moved to open position so as not to obstruct the portion of the platform confined by the brackets 28 and 29 and shroud 30. When the sections 26 and 27 of the door are moved to open position the portions thereof above the vehicle flooring 16 are in a position behind the outer panel 33 of the body and accordingly are concealed from view. In order to permit the sections 26 and 27 to assume a position behind the panel 33, the usual side door pillar 34 is moved rearwardly from the front edge of the panel 33 to the position illustrated in Figure 3 wherein this pillar, in addition to forming a support for the body, functions as a stop for limiting the rearward movement of the door sections 26 and 27. The front edge of the panel 33 is supported by means of a channel-shaped pillar 35 secured to the outer face of the panel adjacent the edge thereof and having the upper end rigidly secured to a support 36 extending rearwardly from the pillar 35 and rigidly secured to the supporting pillar 34 and the body framework as illustrated at 37. The lower end of the pillar 35 is supported in a similar manner by means of a brace 38 secured to the lower end of the supporting pillar and to the floor supporting beam 39.

Figure 5:
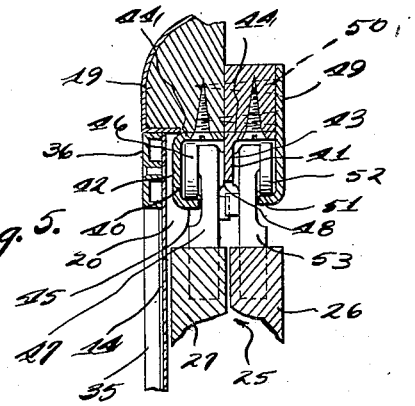
Figure 5 is a sectional view taken on the plane 5—5 of Figure 2.
Figure 6:
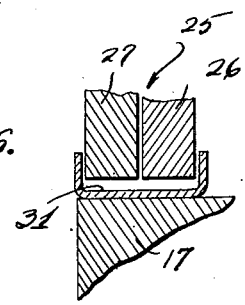
Figure 6 is a sectional view taken on the line 6—6 of Figure 2.

The upper ends of the door sections 26 and 27 as hereinbefore stated are slidably mounted upon the top 19 of the vehicle. For accomplishing this result, I provide inner and outer track members 40 and 41, respectively, having downwardly projecting front walls 42 and 43 and having the base portions 44 thereof secured in any suitable manner to the top assembly 19. The front wall 42 of the outer track member 40 terminates in an inwardly extending flange 45 forming a run-way for the rollers 46 journaled upon brackets 47 which in turn are secured to opposite ends of the outer door section 27. As shown more particularly in Figure 5 the front wall 43 of the inner track 41 engages bearing faces 48 on the brackets 47 and functions to hold the brackets 47 and as a consequence the door section 27 in assembled relation with the track 40. In order to slidably secure the inner section 26 of the door 25 on the body, I provide an L-shaped member 49 extending longitudinally of the top 19 and secured to the inner side face thereof as illustrated at 50. The leg 51 of the L-shaped member preferably extends outwardly in alignment with the flange 45 on the guide 40 and cooperates with the front wall 43 of the guide 41 to form a track for the rollers 52. These latter rollers like the rollers 46 are carried by suitable brackets 53 secured to the opposite ends of the door section 26 and projecting above the same. When assembling the inner and outer door sections 26 and 27 upon the vehicle it will be observed that the track member 40 is first secured in position and then the outer door section 27 assembled with the track member 40 as illustrated in Figure 5. After this is accomplished the track member 41 is secured in the position illustrated in the above figure in such a manner that the front wall 43 thereof engages the brackets 47 carried by the door 27 so as to retain the latter in assembled position upon the track 40. The inner door section 26 is then held in position while the L-shaped guide member 40 is secured to the top with the leg 51 of the L-shaped guide member arranged below the rollers 52 for the inner door section. When this is accomplished both sections of the door are in proper assembled relation and are prevented from accidental movement out of engagement with their respective tracks.

Figure 8:
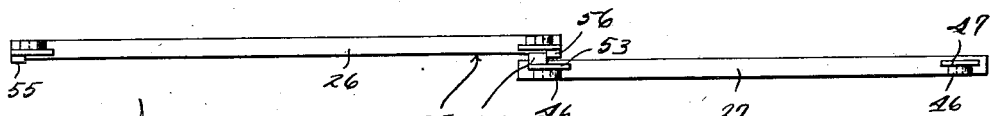
Figure 8 is a top plan view of the construction shown in Figure 7.
Figure 4:
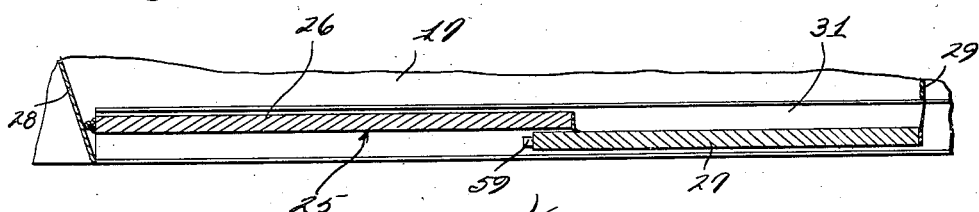
Figure 4 is a cross sectional view taken on the plane 4—4 of Figure 1.
Figure 7:
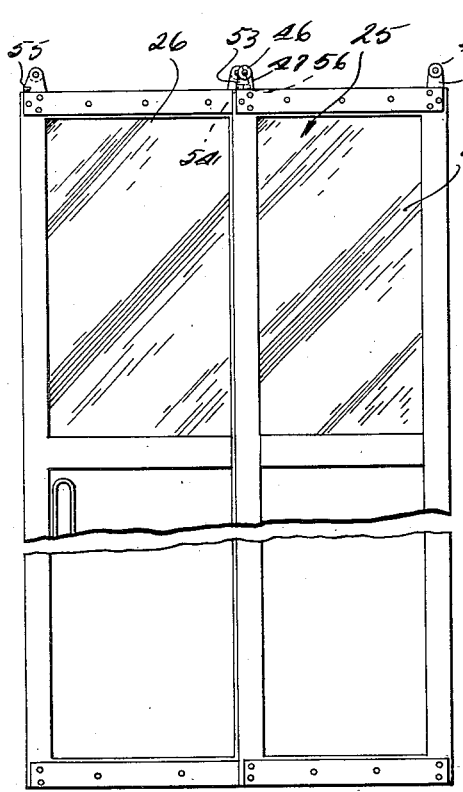
Figure 7 is a side elevational view of one of the doors.

As shown in Figure 8 in order to actuate the outer door section 27 upon movement of the inner door section 26 the front bracket 53 of the outer door section is provided with an inwardly extending lug 54 arranged in the path of travel of the lugs 55 and 56 carried respectively by the front and rear brackets 47 for inner door section. With this construction in mind and assuming that the door sections 26 and 27 are in their closed position as illustrated in Figure 1 and it is desired to open the same, the section 26 is moved rearwardly independent of the section 27 until the lug 55 engages the lug 54 at which time the section 27 will also be moved rearwardly. Likewise when it is desired to close the door the section 26 is merely moved forwardly until the projection 56 carried thereby engages the lug 54 on the door section 27 at which time both sections will be moved as a unit to closed position. Forward movement of the section 27 may be restricted by providing a suitable stop 59 in the channel 31 as illustrated in Figure 3.

Thus from the foregoing it will be observed that I have provided slidable sectional doors for delivery vehicles of the type specified above operable when in their closed position to completely enclose the operator while he is driving the vehicle from a position on either of the low level platforms, and operable when moved to open position to overlap and assume a position behind the outer side panels of the body where they are substantially concealed from view and do not interfere in any way with the operator while he is either driving the vehicle or manipulating the load.

What I claim as my invention is:

1. A delivery body adapted for use upon a motor driven vehicle chassis having front and rear wheels, said body having a storage compartment of a width substantially equal to the tread of said wheels and having a door opening in one side wall thereof, a low level platform within the boundary of the body adjacent to the side door opening aforesaid and located intermediate the front and rear vehicle wheels, front and rear partitions connecting the low level platform with the floor of the storage compartment, said front and rear partitions extending substantially transverse of the body and respectively located substantially in alignment with the front and rear vertical edges of said side door opening, a door structure slidably supported interiorly of the vehicle side wall and operable when in its forward-most position to cooperate with the front partition for closing the side door opening, said door operable when moved rearwardly from the closed position to assume a position rearwardly of said rear partition behind the vehicle side wall of the storage compartment so as to be substantially concealed from view, and door guiding means extending behind the vehicle side wall and thereby concealed from view, said means supported substantially at the level of said low level platform and extending rearwardly of said rear partition whereby to cooperate with the lower edge of said door when open for maintaining said door structure free from a rubbing contact with the vehicle side wall.

2. A delivery body adapted for use upon a motor driven vehicle chassis having front and rear wheels, said body having a storage compartment of a width substantially equal to the tread of said wheels and having a door opening in one side wall thereof, a low level platform within the boundary of the body adjacent to the side door opening aforesaid and located intermediate the front and rear vehicle wheels, front and rear partitions connecting the low level platform with the floor of the storage compartment, said front and rear partitions extending substantially transverse of the body and respectively located substantially in alignment with the front and rear vertical edges of said side door opening, a door structure slidably supported and guided interiorly of the vehicle side wall and operable when in its forwardmost position to cooperate with the front partition for closing the side door opening, said door operable when moved rearwardly from the closed position to assume a position substantially rearwardly of said rear partition behind the vehicle side wall of the storage compartment so as to be substantially concealed from view, the outer edge of said rear partition spaced from the inner face of the vehicle side wall to provide an opening accommodating the door structure when open, and door guiding means extending rearwardly of the rear partition, said guiding means being concealed behind the vehicle side wall and arranged to maintain said door structure free from rubbing contact with vehicle side wall while being opened.

3. A delivery body adapted for use upon a motor driven vehicle chassis having front and rear wheels, said body having a storage compartment of a width substantially equal to the tread of said wheels and having a door opening in one side wall thereof, a low level platform within the boundary of the body adjacent to the side door opening aforesaid and located intermediate the front and rear vehicle wheels, front and rear partitions connecting the low level platform with the floor of the storage compartment, said front and rear partitions extending substantially transverse of the body and respectively located substantially in alignment with the front and rear vertical edges of said side door opening, a door structure slidably supported interiorly of the vehicle side wall and operable when in its forwardmost position to cooperate with the front partition for closing the side door opening, said door operable when moved rearwardly from the closed position to assume a position rearwardly of said rear partition behind the vehicle side wall of the storage compartment so as to be substantially concealed from view, the outer edge of said rear partition spaced from the inner face of the vehicle side wall to provide an opening accommodating the door structure when open, and door guiding means supported substantially at the level of said low level platform and extending through said opening, said door guiding means supported on said platform and extending rearwardly of the rear partition, said door guiding means being further concealed behind the vehicle side wall and constructed for guiding the door structure free from a rubbing contact with the said vehicle side wall when being opened.

4. A delivery body adapted for use upon a motor driven vehicle chassis having front and rear wheels, said body having a storage compartment of a width substantially equal to the tread of said wheels and having a door opening in one side wall thereof, a low level platform within the boundary of the body adjacent to the side door opening aforesaid and located intermediate the front and rear vehicle wheels, front and rear partitions connecting the low level platform with the floor of the storage compartment, a door structure slidably supported interiorly of the vehicle side wall and operable when in its forwardmost position to cooperate with the front partition for closing the side door opening, said door operable when moved rearwardly from the closed position to assume a position rearwardly of said rear partition behind the vehicle side wall of the storage compartment so as to be substantially concealed from view, said door structure comprising relatively slidable sections positioned side by side when moved rearward as aforesaid, and door guiding means comprising a channel supported substantially at the level of said low level platform and extending rearwardly of said side door opening to accommodate both of said door sections.

5. A delivery body adapted for use upon a motor driven vehicle chassis having front and rear wheels, said body having a storage compartment of a width substantially equal to the tread of said wheels and having a door opening in one side wall thereof, a low level platform within the boundary of the body adjacent to the side door opening aforesaid and located intermediate the front and rear vehicle wheels, front and rear partitions connecting the low level platform with the floor of the storage compartment, a door structure slidably supported interiorly of the vehicle side wall and operable when in its forwardmost position to cooperate with the front partition for closing the side door opening, said door operable when moved rearwardly from the closed position to assume a position rearwardly of said rear partition behind the vehicle side wall of the storage compartment so as to be substantially concealed from view, said door structure comprising relatively slidable sections positioned side by side when moved rearward as aforesaid, and door guiding means comprising a channel supported substantially at the level of said low level platform and extending rearwardly of said side door opening to accommodate both of said door sections, and individual door supporting tracks supported adjacent the top of the vehicle side wall for separately supporting said door sections.

6. A delivery body adapted for use upon a motor driven vehicle chassis having front and rear wheels, said body having a storage compartment of a width substantially equal to the tread of said wheels and having a door opening in one side wall thereof, a door structure slidably supported for cooperative operation with said door opening, a low level platform within the boundary of the body whereby to provide standing height clearance therein and located adjacent the said side door opening intermediate the front and rear vehicle wheels, said side door opening located in general forwardly of the vehicle center, said body having a top rail, a door post acting as an abutment to limit the opening movement of said door structure and located rearwardly of the rear edge of said side door opening and extending from the top rail to a point in line with the level of said low level platform, a second door post secured to the vehicle side wall at the rear edge of the side door opening, and rearwardly extending struts located intermediate the top and bottom extremities of the first and second door posts for connecting said second door post with the first said door post, whereby to locate the first said door post and to maintain same in fixed relation with respect to the door opening.

7. A delivery body adapted for use upon a motor driven vehicle chassis having front and rear wheels, said body having a storage compartment of a width substantially equal to the tread of said wheels and having a door opening in one side wall thereof, a door structure slidably supported for cooperative operation with said door opening, a low level platform within the boundary of the body whereby to provide standing height clearance therein and located adjacent the said side door opening intermediate the front and rear vehicle wheels, said side door opening located in general forwardly of the vehicle center, said body having a top rail, a door post acting as an abutment to limit the opening movement of said door structure and located rearwardly of the rear edge of said side door opening and extending from the top rail to a point in line with the level of said low level platform, a second door post secured to the vehicle side wall at the rear edge of the side door opening and externally of said vehicle body side wall, and rearwardly extending struts located intermediate the top and bottom extremities of the first and second door post for connecting said second door post with the first said door post whereby to locate the first said door post and to maintain same in fixed relation with respect to the door opening, said struts secured externally of said vehicle body side wall.

KENNETH R. HERMAN.